United States Patent [19]

Ninomiya et al.

[11] Patent Number: 5,240,331
[45] Date of Patent: Aug. 31, 1993

[54] STRUCTURE OF BALL ROLLING GROOVES FOR A LINEAR GUIDE APPARATUS

[75] Inventors: Mizuho Ninomiya, Maebashi; Nobuyuki Osawa, Takasaki, both of Japan

[73] Assignee: NSK Ltd., Tokyo, Japan

[21] Appl. No.: 924,640

[22] Filed: Aug. 4, 1992

[30] Foreign Application Priority Data

Aug. 7, 1991 [JP] Japan .................... 3-62356

[51] Int. Cl.$^5$ .................................................. F16C 29/06
[52] U.S. Cl. ................................................... 384/45
[58] Field of Search ........................ 384/45, 43, 44; 464/168

[56] References Cited

U.S. PATENT DOCUMENTS

| 4,348,064 | 9/1982 | Teramachi | 384/45 |
| 4,773,770 | 9/1988 | Osawa et al. | 384/45 |
| 4,850,720 | 7/1989 | Osawa | 384/45 |
| 4,943,169 | 7/1990 | Kasai | 384/43 |

FOREIGN PATENT DOCUMENTS 64-53622 4/1989 Japan .
3-31934 2/1990 Japan .

*Primary Examiner*—Lenard A. Footland
*Attorney, Agent, or Firm*—Shapiro and Shapiro

[57] ABSTRACT

A linear guide apparatus, capable of displaying a well-balanced performance both in the aspects of vibration damping capacity, rigidity, load capacity, shock resistance, and others, and of the follow-up sensitivity to minute and precise operations, is provided by arranging the apparatus with a combined structure of four-point contact and two-point contact ball rolling grooves. Of the upper and lower two ball rolling grooves, one row of the ball rolling grooves is of a four-point contact type and the other row of the ball rolling grooves is of a two-point contact type.

1 Claim, 3 Drawing Sheets

STRUCTURE OF BALL ROLLING GROOVES FOR A LINEAR GUIDE APPARATUS

BACKGROUND OF THE INVENTION

1. Field of the Invention

The present invention relates to the structure of ball rolling grooves for a linear guide apparatus, which receives loads through a number of balls infinitely circulating while rolling in the ball rolling grooves formed opposedly on both sides of a guide rail and the slider which travels freely thereon. More particularly, the invention relates to the structure of ball rolling grooves for a linear guide apparatus suited for the use of a guide bearing for the principal part of a machine tool which requires minute and precise operations.

2. Related Background Art

In the linear guide apparatus, there are formed two rows of ball rolling grooves 3 each on either side of the guide rail 1 extending in the axial direction as shown in FIG. 4 to FIG. 6, and a ball rolling groove 5 facing the aforesaid ball rolling groove 3 and a ball returning pass 7 in parallel thereto are provided each on both sleeves of the slider 2 which is slidably mounted on the guide rail 1. Thus, a number of balls B rolling in both of the ball rolling grooves 3 and 5 following the traveling of the slider 2 are guided into the ball returning pass 7 so that the balls are infinitely circulated. In the case of the conventional linear guide apparatus, the structure of the ball rolling grooves is confined either to a four-point contact type or a two-point contact type.

In other words, the structure shown in FIG. 4 is of a four-point contact type, in which the groove surfaces of both opposed ball rolling grooves 3 and 5 and the balls B are in contact at four points in each of the upper and lower grooves, and the contacting lines connecting the contact points themselves of both ball rolling grooves 3 and 5 intersect at right angles at the central position of the grooves.

On the other hand, the structures shown in FIG. 5 and FIG. 6 are of a two-point contact type, and in both of them, the groove surfaces of both opposed ball rolling grooves 3 and 5 and balls B are in contact at two points in each of the upper and lower grooves.

Traditionally, there has also been a structure in which the two-point contact and four-point contact are combined such as disclosed in Japanese Utility Model Laid-Open Application No. 64-53622. However, this disclosed structure is of a three-row type in which a four-point contact is arranged in the center while a two-point contact is provided each in the upper row and lower row to enable its contacting angles to be intersected, and the three-row structure makes the apparatus thick (that is, its height becomes great). There is further a structure disclosed in Japanese Patent Publication No. 3-31934, which requires space adjusting means 6 while the lower row is of a four-point contact type. As a result, when a load is applied to its slider, the both legs of the slider tend to be expanded, causing the four-point contact in the lower row to serve as if a two-point contact. Thus, the anticipated effect of the four-point contact is hard to be obtained.

A structure of such a type that the balls B are in contact at four points in all the ball rolling grooves in the upper and lower rows has the advantages in the aspect of vibration damping capacity, rigidity, load capacity, shock resistance, and others, but, on the other hand, a problem is encountered in that it lacks follow-up sensitivity when an extremely minute and precise operation is required.

Meanwhile, a structure of such a type that the balls B are in contact at two points in all the ball rolling grooves in the upper and lower rows is suited for the use of light-duty operations because the rolling frictions of the balls are small, but on the other hand, a problem is encountered in that it lacks the vibration damping capacity, rigidity, load capacity, shock resistance, and others.

SUMMARY OF THE INVENTION

Therefore, with a view to solving the problems encountered in the conventional two-point type and four-point type, respectively, the present invention is designed. It is an object of the invention to provide a structure of ball rolling grooves for a linear guide apparatus capable of displaying a well-balanced performance both in the aspects of the vibration damping capacity, rigidity, load capacity, shock resistance, and others, and the follow-up sensitivity to the minute and precise operations by arranging the ball rolling grooves with a combined structure of four-point contact and two-point contact.

A linear guide apparatus according to the present invention is characterized by arranging its structure in such a manner that one of the rows of the ball rolling grooves in the upper and lower two ball rolling grooves which make a pair on the left- and right-hand sides is of the four-point contact type and the other one of them is of the two-point contact type.

By arranging one of the ball rolling grooves in the upper and lower two rows to be of the four-point contact type, it is possible to maintain the vibration damping capacity, rigidity, load capacity, shock resistance and others higher than the conventional two-point contact type while by arranging the other one of the ball rolling grooves to be of the two-point contact type, it is possible to keep its excellent follow-up sensitivity as compared with the conventional four-point contact type, hence enabling to display a well-balanced performance of the apparatus.

DETAILED DESCRIPTION OF THE PREFERRED EMBODIMENT

Figure 1:
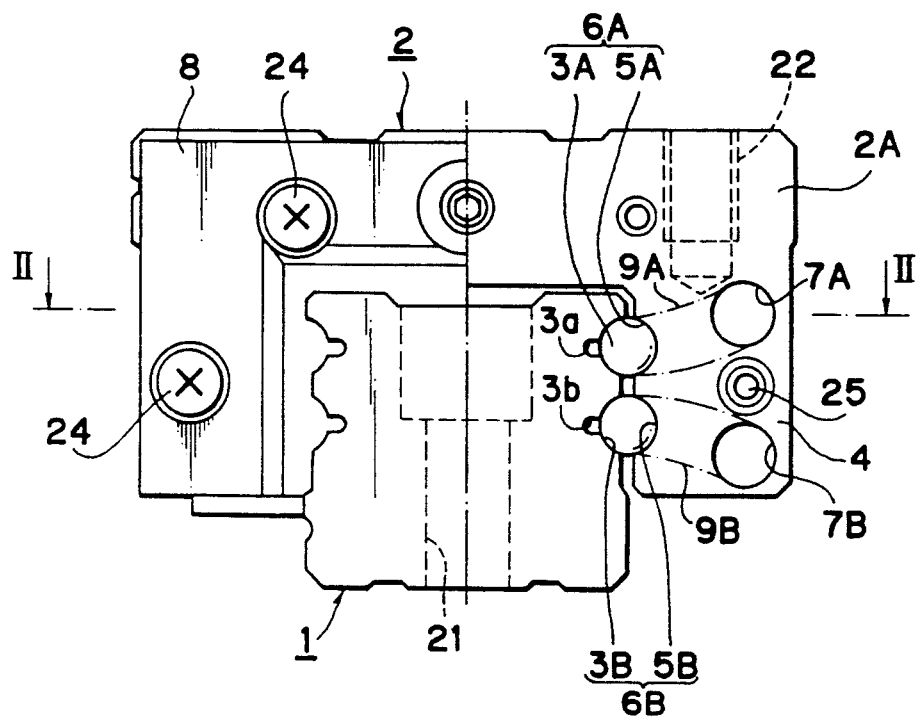
FIG. 1 is a partially cut off front view illustrating a linear guide apparatus according to an embodiment of the present invention.

Hereinafter, with reference to the accompanying drawings, the description will be made of an embodiment according to the present invention. In this respect, the same reference numerals are given to the same parts as or the parts equivalent to the conventional ones.

Figure 2:
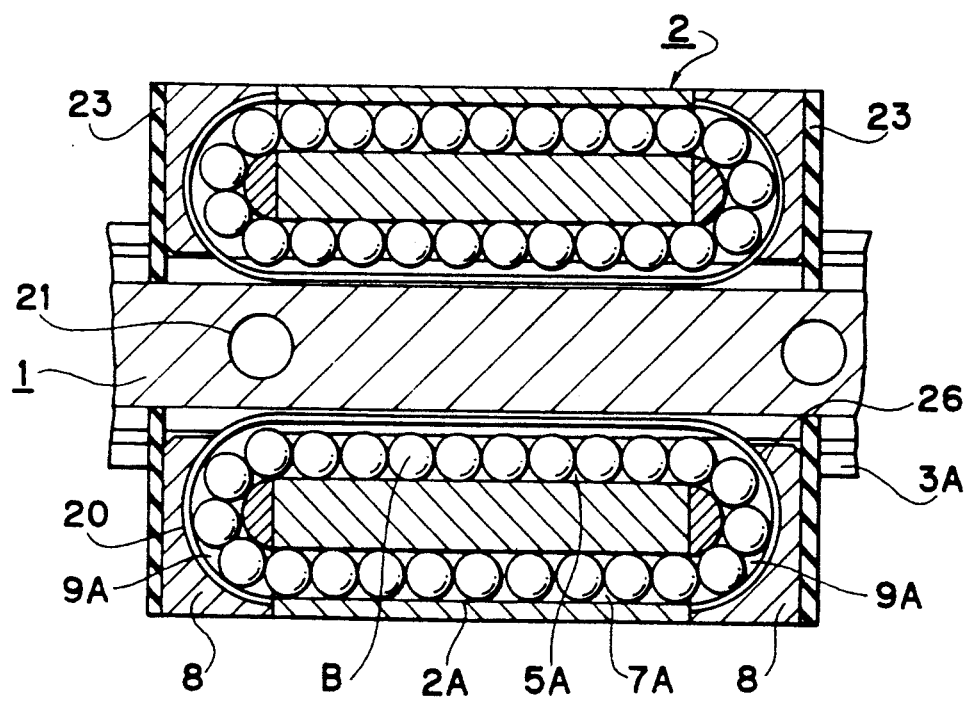
FIG. 2 is a cross-sectional view along II—II line in FIG. 1.
Figure 3:
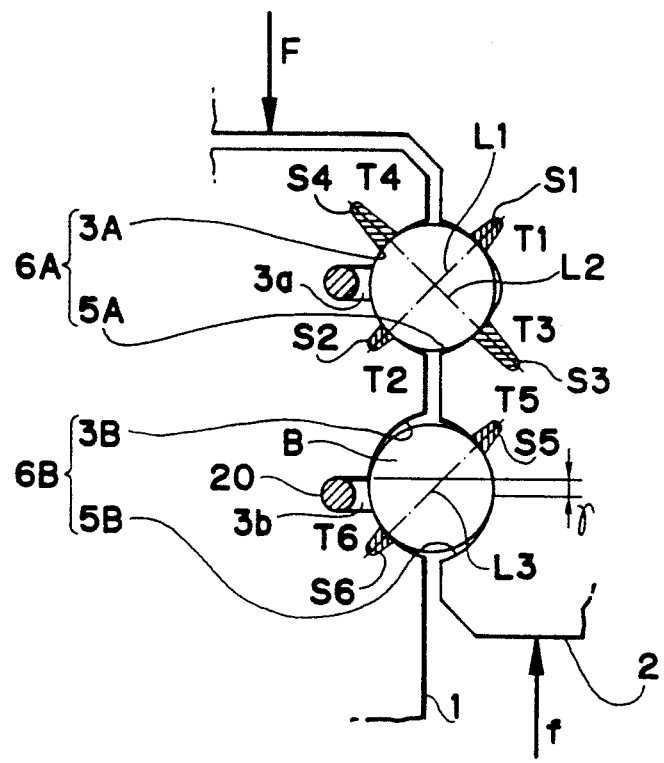
FIG. 3 is a partial enlargement of the principal part of the apparatus shown in FIG. 1.
Figure 4:
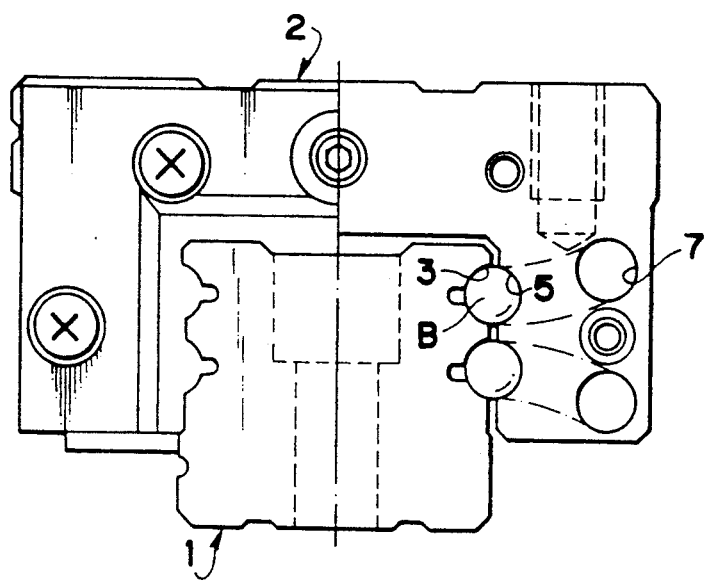
FIG. 4 is a partially cut off front view of a conventional linear guide apparatus.
Figure 5:
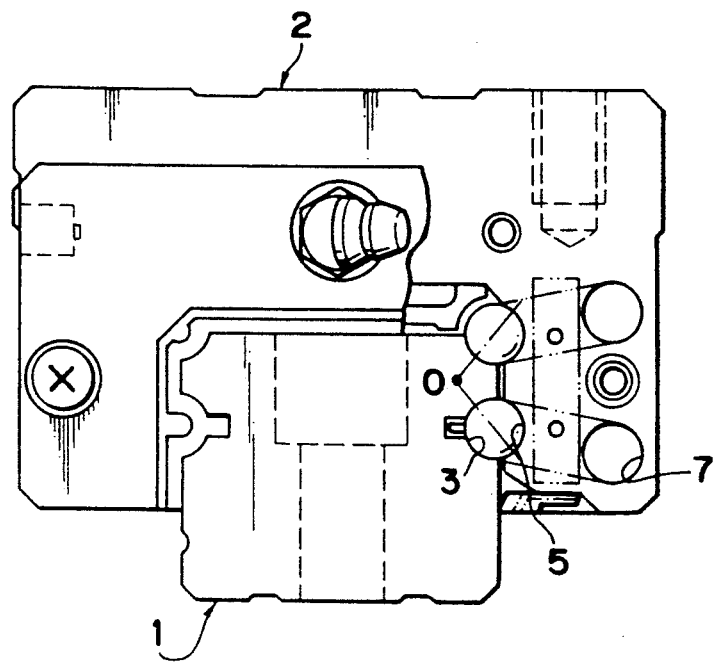
FIG. 5 is a partially cut off front view of another conventional linear guide apparatus.
Figure 6:
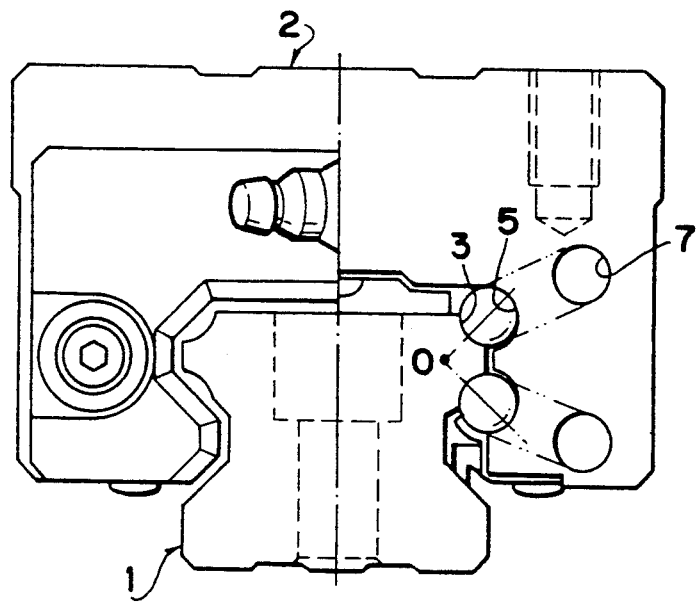
FIG. 6 is a partially cut off front view of still another conventional linear guide apparatus.

FIG. 1 to FIG. 3 are views showing an embodiment according to the present invention, in which a slider 2 which is substantially inversed ⊐ shaped at its transverse section is mounted on a guide rail 1 relatively slidably. On both sides of the guide rail 1, two rows of ball rolling grooves 3A and 3B are formed extendedly in the axial direction in the upper stage and lower stage. The ball rolling groove 3A is formed by the two circular surfaces having the same curvature with different centers and V-letter shape at its transverse section, that is, the so-called Gothic arc type groove. The ball rolling groove 3B is formed with a single circular surface, the so-called circular groove. At each bottom of these grooves, clearance grooves 3a and 3b for a wire holder are annexed thereto in the axial direction.

On the other hand, on the inner sides of both sleeves 4 of the main body 2A of the slider 2, the ball rolling groove 5A which faces the upper ball rolling groove 3A and the ball rolling groove 5B which faces the lower ball rolling groove 3B are formed, respectively, and these upper and lower two rows of the facing grooves themselves constitute the ball rolling grooves 6A and 5B. On both sleeves 4 of the main body 2A of the slider, there are further provided the ball returning pass 7A having circular cross-section which is paralled to the ball rolling groove 6A and the ball returning pass 7B which is also paralled to the ball rolling groove 6B are formed through the sleeve in the axial direction.

Now, in the end caps 8 which are respectively connected to both the front and rear ends of the slider main body 2A in this respect, the ball circulating grooves 9A and 9B of a half doughnut shaped are formed in upper and lower two stages. The upper ball circulating groove 9A connects the ball rolling groove 6A and the ball returning pass 7A while the lower ball circulating groove 9B connects the ball rolling groove 6B and the ball returning pass 7B. Then, a number of balls B are filled respectively in each of the infinite ball circulating pass constructed by each of the ball rolling grooves 6A and 6B, the related ball circulating grooves 9A and 9B as well as the ball returning passes 7A and 7B.

Here, the detailed description will be further made of the structure of the above-mentioned ball rolling grooves 6A and 6B formed between the guide rail 1 and the slider 2 in conjunction with FIG. 3.

In the upper ball rolling groove 6A, the groove center of the ball rolling groove 5A for the slider is slightly offset upwardly with respect to the groove center of the ball rolling groove 3A for the guide rail. Thus, the balls B in the ball rolling groove 6A are in contact with the groove surface of the ball rolling groove 5A on the slider side at the points T1 and T3 and at the same time, they are in contact with the groove surface of the ball rolling groove 3A on the guide rail side at the points T2 and T4; hence, the balls are in contact with the groove surface of the ball rolling groove 6A at four points. The contacting line L1 connecting the contact points T1 and T2 and the contacting line L2 connecting the contact points T3 and T4 are orthogonal at the center position of the ball rolling groove 6A.

On the other hand, in the lower ball rolling groove 8B, the ball rolling groove 5B for the slider is offset downwardly ($\gamma$), greater than the offsetting in the case of the upper ball rolling groove, with respect to the ball rolling groove 3B for the guide rail. The balls B in the ball rolling groove 6B are in contact with the groove plane of the bail rolling groove 5B on the slider side at the point T5 and are also in contact with the groove plane of the ball rolling groove 3B at the point T6; thus the balls are in contact with the groove plane of the ball rolling groove 6B at two points. The contacting line L3 connecting the contact points T5 and T6 in the ball rolling groove 6B is in parallel with the contacting line L1 in the ball rolling groove 6A.

Consequently, the relations of the sizes of the contacting forces (preloads) S to be exerted on each of the above-mentioned contact points T1 to T6 are defined so that the sum of the contacting forces having the same working direction becomes equal to the sum of the contacting forces in the direction rectangular to it. Thus, the load distributions in the different contacting directions are balanced.

In other words, given the contacting force at the contact point T1 as S1, the contacting force at the contact point T2 as S2, the contacting force at the contact point T3 as S3, and the contacting force at the contact point T4 as S4 in the upper ball rolling groove 6A, and the contacting force at the contact point T5 as S5 and the contacting force at the contact point T6 as S6 in the lower ball rolling groove 6B, and assuming that the S1, S2, S5, and S6, the working lines of which are in parallel and in the same direction, as 1, the S3 and S4 which are in the direction rectangular thereto become 2. This adjustment of the contacting forces is controlled with a high precision by abrasive machining of each curvature of the rolling grooves and the distances between the guide rail and the centers of the aforesaid curvatures of the slider. Also, this is controlled by the selection of the dimensions of the inclusive balls, if required.

In this respect, a reference numeral 20 designates the wire retainer which retains the balls B filled in the ball rolling grooves 5A and 5B formed on the inner sides of the main body 2A of the slider 2; also, 21, through hole for a bolt used for fixing the guide rail 1 to the base and others (not shown) when the linear guide apparatus is used; 22, a threaded hole for a bolt to fix the slider 2 to a driven body such as a table; 23, a wiper seal made of a synthetic rubber mounted on the end cap 8 by screws 24 for wiping the ball rolling grooves 3A and 3B for the guide rail 1 to prevent ingression of foreign particles; and 25, a threaded hole for the screw 24.

Subsequently, the operation of the above-mentioned embodiment will be described.

When the slider 2 fixed on a table is allowed to travel in the axial direction on the guide rail 1 fixed on a machine base, for example, the balls B filled in the ball rolling groove 6A (6B) are rolled accompanying the traveling of the slider 2, and caused to travel with respect to the slider 2 in the direction opposite to the traveling direction of the slider 2. Then, at the end of the slider 2, they are guided into the scoop-up portion 26 provided for the end cap 8 to change their traveling directions, and are U turned along the ball circulating pass 9A (9B). In continuity, they travel through the ball returning pass 7A of the main body 2A of the slider and return to the ball rolling groove 6A (6B) after being U turned again by the ball circulating pass 9A (9B) at the opposite side of the end cap 8; hence, while continuously rolling, the balls repeat their traveling circulation. In this way, it is possible for the table to travel smoothly on the guide rail through the slider 2.

Then, according to the present embodiment, one of the two upper and lower ball rolling grooves is of the four-point contact type and has a higher capability than the conventional two-contact point type in the vibration damping capacity, rigidity, load capacity, shock resistance and others, and the other one of the ball rolling grooves is of the two-point type, thus having an excellent follow-up sensitivity to minute and precise operations as compared with the conventional four-point contact type. As a result, it is possible to obtain an effect that a well-balanced performance is displayed.

Furthermore, there is provided an effect that the two rows receive a load evenly with respect to changes in the load in service by arranging the relations between the contacting forces exerted on the contact points of the respective ball rolling planes of the upper and lower rows and the balls so that each of the contacting forces on the working lines in the same direction in the upper and lower two rows is made substantially the same.

As described above, according to the present embodiment, the upper ball rolling grooves in two rows are of the four-point contact structure while the lower ones are of the two-point contract structure. Hence, it is possible to obtain a significant effect in providing a linear guide apparatus which has a high rigidity against the applied loads and excellent vibration damping capacity, load capacity, shock resistance and other functions as well as an excellent follow-up sensitivity to minute and precise light operations.

What is claimed is:

1. A ball rolling structure for a linear guide apparatus comprising:

a guide rail having two lines of ball rolling grooves respectively on both sides thereof;

a slider having ball rolling grooves corresponding to said two ball rolling grooves, respectively, and traveling on said guide rail in the axial direction; and upper and lower two ball rolling rows provided with a number of balls between said guide rail and said ball rolling grooves for said slider, wherein said upper row is of a four-point contact and said lower row is of a two-point contact, the relations between the preloaded contacting forces which are exerted on the contact points of each of the ball rolling groove surfaces and the balls is arranged so that the preloaded contacting force in said two-point contact grooves and the preloaded contacting force in said four-point contact groove in the same direction as the direction of the working line which works onto said two-point contact grooves are made substantially the same, and the structure is arranged to make each value of said preloaded contacting forces in the same direction substantially half the preloaded contacting force in the contact grooves in the direction intersecting said working line in said four-point contact grooves.

* * * * *